United States Patent
Yu et al.

(10) Patent No.: US 9,467,066 B1
(45) Date of Patent: Oct. 11, 2016

(54) CONTROL METHOD FOR DC TO AC CONVERTER

(71) Applicant: INDUSTRIAL TECHNOLOGY RESEARCH INSTITUTE, Hsinchu (TW)

(72) Inventors: Ming-Hung Yu, Miaoli (TW); Po-Li Chen, Erlin Township, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/962,773

(22) Filed: Dec. 8, 2015

(30) Foreign Application Priority Data

Oct. 7, 2015 (TW) .............................. 104133011 A

(51) Int. Cl.
*H02M 1/00* (2006.01)
*H02M 5/42* (2006.01)
(Continued)

(52) U.S. Cl.
CPC .................................. *H02M 7/537* (2013.01)

(58) Field of Classification Search
CPC ............ H02M 2001/0032; H02M 2001/0035; H02M 1/042; H02M 1/045; H02M 1/081; H02M 1/082; H02M 1/084; H02M 1/088; H02M 7/48; H02M 7/487; H02M 7/525; H02M 7/53; H02M 7/53871; H02M 7/538466
USPC ......... 363/37, 78–80, 97, 98, 131, 132, 137, 363/138
See application file for complete search history.

(56) References Cited

U.S. PATENT DOCUMENTS 7,126,294 B2 * 10/2006 Minami .................... G05F 1/67
318/139

8,035,257 B2    10/2011 Fornage
(Continued)

FOREIGN PATENT DOCUMENTS

CN      103036461 A    4/2013
TW      201108576 A    3/2011
(Continued)

OTHER PUBLICATIONS

Zheng Zhao, Kuan-Hung Wu, Jih-Sheng Lai, Wensong Yu, "Utility Grid Impact With High Penetration PV Micro-Inverters Operating Under Burst Mode Using Simplified Simulation Model", The Bradley Department of Electrical and Computer Engineering, Virginia Polytechnic Institute and State University, U.S.A. Energy Conversion Congress and Exposition (ECCE), 2011 IEEE, Phoenix, AZ, Sep. 17-22, 2011, p. 3928-3932.

(Continued)

*Primary Examiner* — Adolf Berhane
*Assistant Examiner* — Gary Nash
(74) *Attorney, Agent, or Firm* — Muncy, Geissler, Olds & Lowe, P.C.

(57) ABSTRACT

A control method for a DC to AC converter, selectively operating in a continuous conduction mode and a discontinuous conduction mode is disclosed. In the discontinuous conduction mode, the DC to AC converter outputs a first output signal having a first work frequency according to a power value of an input signal. The first work frequency relates to a plurality of first cycles. A first transition period and a first standby period in each first cycle have a first time ratio therebetween. Determine a power value of the first output signal produced during the first transition period. When the power value of the first output signal increases, the first work frequency is increased. When the power value of the first output signal decreases, the first work frequency is decreased.

10 Claims, 8 Drawing Sheets

(51) Int. Cl.
 *H02M 7/68* (2006.01)
 *H02M 3/24* (2006.01)
 *H02M 7/44* (2006.01)
 *H02M 7/521* (2006.01)
 *H02M 7/537* (2006.01)

(56) References Cited

U.S. PATENT DOCUMENTS

| | | | |
|---|---|---|---|
| 8,284,574 B2 | 10/2012 | Chapman et al. | |
| 8,319,378 B2 | 11/2012 | Fornage | |
| 8,514,599 B2 | 8/2013 | Lee et al. | |
| 9,112,430 B2 | 8/2015 | Elpel | |
| 2009/0219000 A1 | 9/2009 | Yang | |
| 2011/0292701 A1 | 12/2011 | Fornage | |
| 2012/0250378 A1 | 10/2012 | Kok et al. | |
| 2013/0038390 A1 | 2/2013 | Siomkos et al. | |
| 2014/0009989 A1* | 1/2014 | Lin | H02M 3/156 363/132 |
| 2014/0211529 A1 | 7/2014 | Kandasamy et al. | |
| 2014/0218985 A1* | 8/2014 | Yu | H02M 7/537 363/97 |

FOREIGN PATENT DOCUMENTS

| | | |
|---|---|---|
| TW | 201128912 A | 8/2011 |
| TW | I382646 B | 1/2013 |
| TW | 201526515 A | 7/2015 |
| WO | WO2013/059088 A1 | 4/2013 |

OTHER PUBLICATIONS

Yang Du, Weidong Xiao, Yihua Hu, and Dylan Dah-Chuan Lu, "Control Approach to Achieve Burst Mode Operation With DC-Link Voltage Protection in Single-Phase Two-Stage PV Inverters", Department of Electrical Engineering and Computer Science, Masdar Institute of Science and Technology, Abu Dhabi, United Arab Emirates Energy Conversion Congress and Exposition (ECCE), 2014 IEEE, Pittsburgh, PA, Sep. 14-18, 2014, p. 47-52.

* cited by examiner

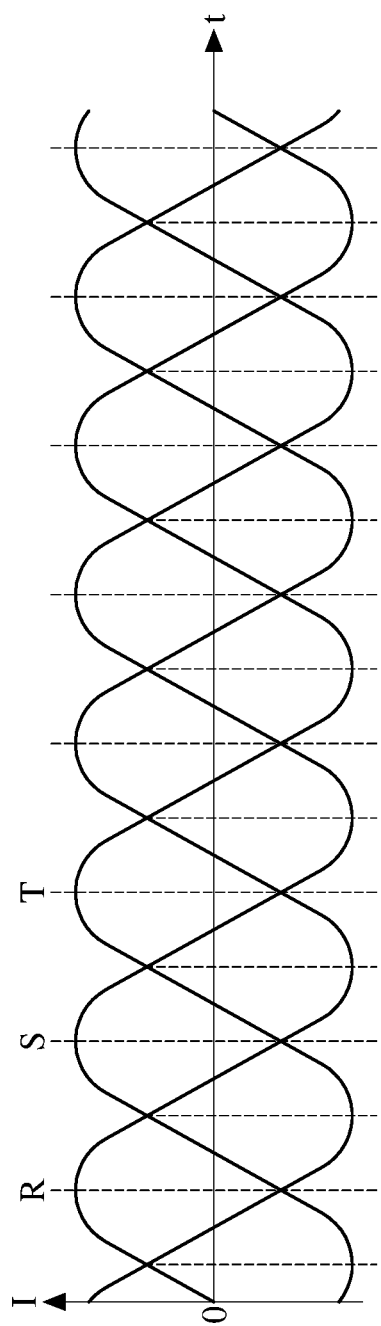

CONTROL METHOD FOR DC TO AC CONVERTER

CROSS-REFERENCE TO RELATED APPLICATIONS

This non-provisional application claims priority under 35 U.S.C. §119(a) on Patent Application No(s). 104133011 filed in Taiwan, R.O.C. on Oct. 7, 2015, the entire contents of which are hereby incorporated by reference.

TECHNICAL FIELD

The disclosure relates to a control method applied to a DC to AC converter.

BACKGROUND

Conventional solar energy systems first use a photovoltaic module to acquire DC electricity and then use a DC to DC converter to convert and modulate the acquired DC electricity before using a DC to AC converter, which is structured with bridge rectifying switches, to convert the DC electricity into AC electricity. Finally, this AC electricity is outputted after a LC filter filters out the high frequency part. Because of the nonlinearity between voltage and current of the photovoltaic module, a varied input voltage and current condition will affect the output power of the DC to AC converter.

Particularly, the frequently changing of the intensity of sunlight will cause the great variations of the input voltage and load level of the converter. A weaker intensity of sunlight causes the lighter load and lower conversion rate for the converter. However, no matter if the load of the converter is heavy or light; the control circuit within the converter will consume a substantially constant quantity of energy during operation. Therefore, the percentage of the input energy occupied by the energy consumption of the control circuit will become greater during the light load. Moreover, no matter if the load of the converter is heavy or light, the core loss caused by energy storage inductors and the switching power loss may easily occur on the AC electricity outputted by the converter turning on/off the switching components. Therefore, the conversion rate of the converter becomes inferior under light load.

SUMMARY

According to one or more embodiments, the disclosure provides a control method applied to a DC to AC converter capable of selectively operating in a continuous conduction mode or in a discontinuous conduction mode. In the discontinuous conduction mode, the control method includes the following steps. The DC to AC converter outputs a first output signal in a first work frequency according to a power value of an input signal. The first work frequency is associated with a plurality of first cycles, and a first transition period and a first standby period in each of the first cycles have a first time ratio therebetween. During the first transition period, the DC to AC converter detects a power value of the first output signal. When the power value of the first output signal is increasing, the DC to AC converter increases the first work frequency. When the power value of the first output signal is decreasing, the DC to AC converter decreases the first work frequency.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 5 is a schematic diagram of an output signal of the DC to AC converter in a continuous conduction mode in an embodiment;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
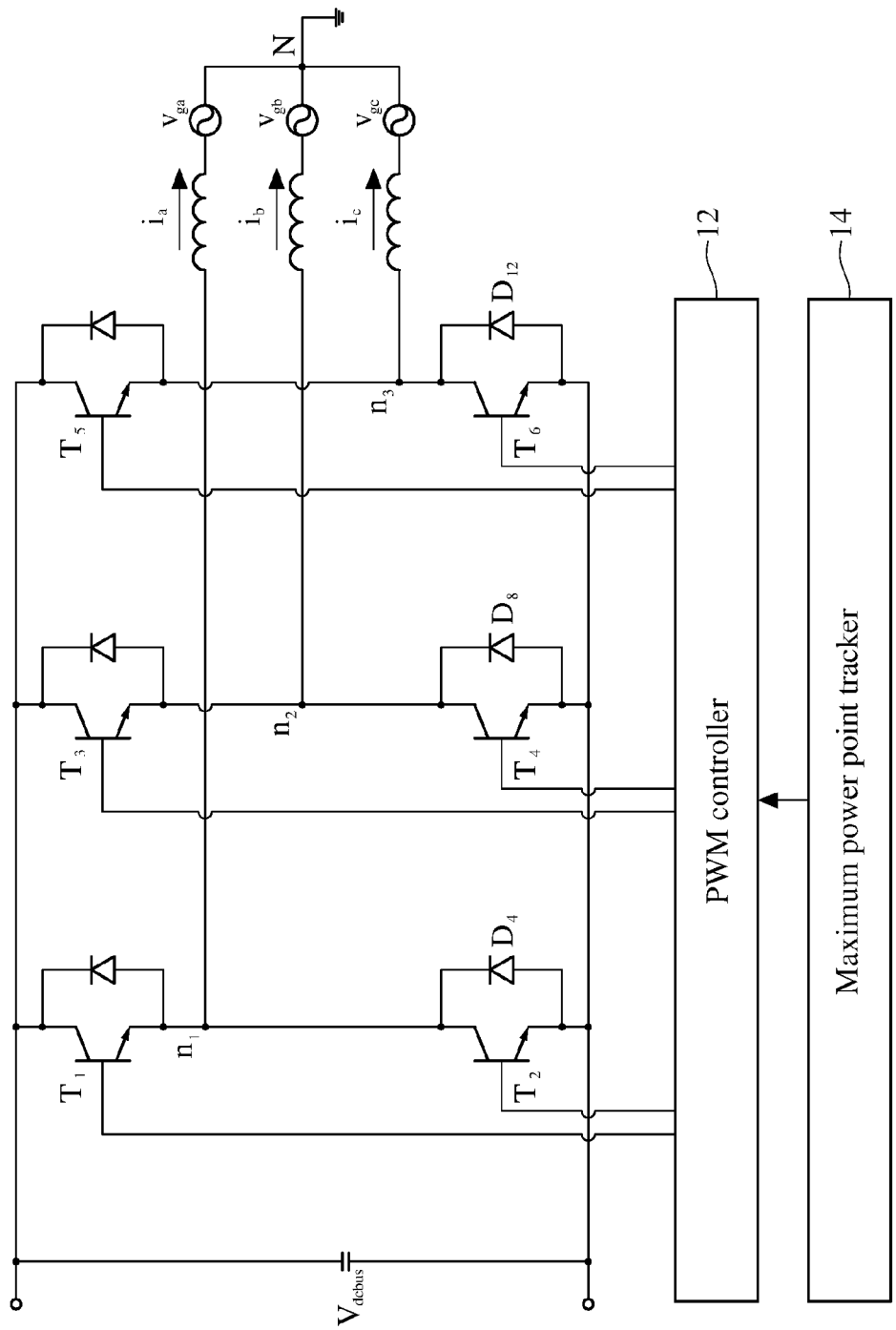
FIG. 1 is a schematic circuit diagram of a DC to AC converter in an embodiment.
Figure 2:
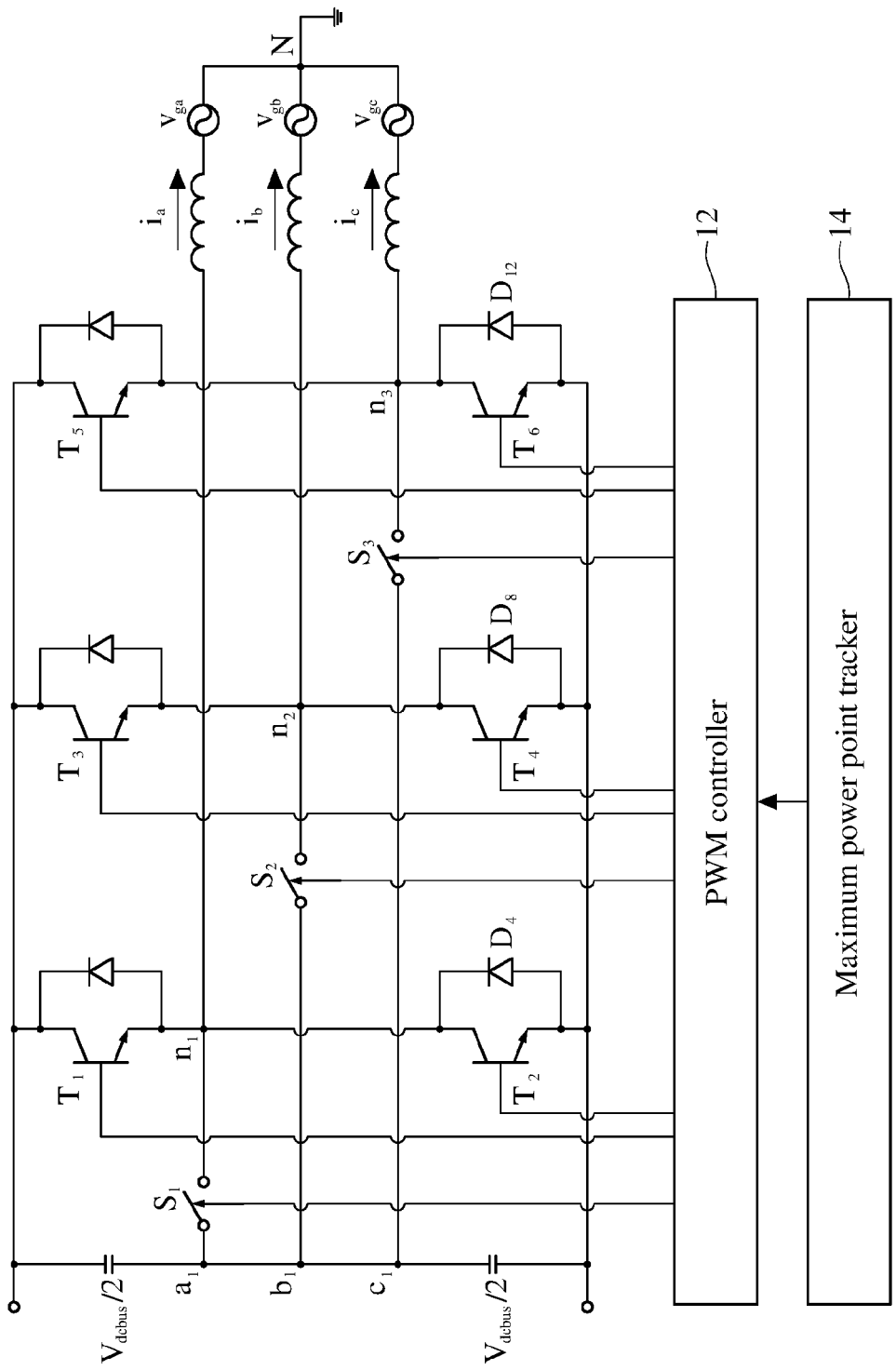
FIG. 2 is a schematic circuit diagram of a DC to AC converter in another embodiment.
Figure 3:
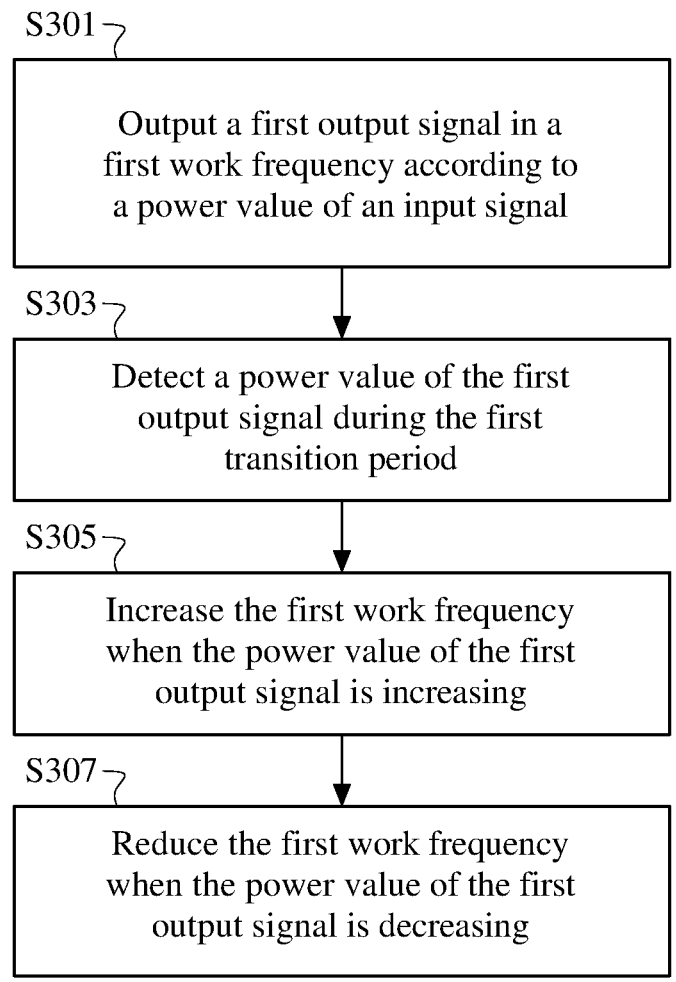
FIG. 3 is a flow chart of a control method applied to the DC to AC converter in an embodiment.
Figure 4:
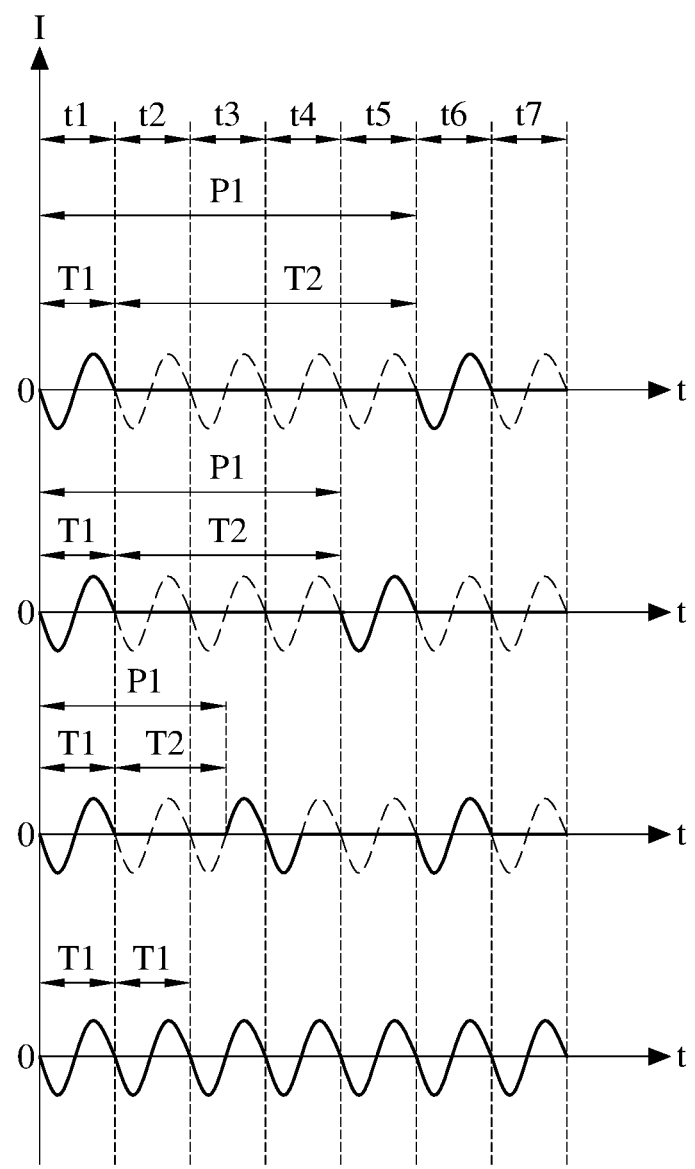
FIG. 4 is a schematic diagram of an output signal of the DC to AC converter in a discontinuous conduction mode in an embodiment.

Please refer to FIG. 1 to FIG. 3. FIG. 1 is a schematic circuit diagram of a DC to AC converter in an embodiment, FIG. 2 is a schematic circuit diagram of a DC to AC converter in another embodiment, FIG. 3 is a flow chart of a control method applied to the DC to AC converter in an embodiment, and FIG. 4 is a schematic diagram of an output signal of the DC to AC converter in a discontinuous conduction mode in an embodiment. A converter 10 is, for example, a DC to AC converter, a three-phase converter as shown in FIG. 1 or 2, or another available converter. The three-phase converter includes a first, second and third switch set. The input terminals of the first, second and third switch sets are electrically connected to a photovoltaic module to receive DC electricity from the photovoltaic module. The output terminals of the first, second and third switch sets are electrically connected to a power grid-side to feed AC electricity, which is converted from the DC electricity, into supply mains. In an embodiment, the input terminals and output terminals of the first, second and third switch sets are electrically connected to a filter or other suitable electronic components.

The first, second and third switch sets in the converter 10 are controlled by the pulse-width modulation (PWM) controller 12, and the PWM controller 12 is electrically connected to a maximum power point tracker (MPPT) 14. In an embodiment, the maximum power point tracker 14 employs the PWM controller 12 to control the work cycles of the first, second and third switch sets in order to measure the variation of output power of the converter 10 or measure the loading of the converter 10. Other embodiments may be contemplated in which the maximum power point tracker 14 also has another way to detect the variation of output power of the converter 10.

When the loading, i.e. the electricity received from the photovoltaic module, of the converter 10 abates from a heavy load level to a light load level, the converter 10 switches to a discontinuous conduction mode (DCM) from a continuous conduction mode (CCM).

In the discontinuous conduction mode, the converter 10 outputs a first output signal in a first work frequency according to the power value of an input signal, as shown in step S301. In step S303, the converter 10 detects the power value of the first output signal during a first transition period. In step S305, when the power value of the first output signal is increasing, the converter 10 increases the first work frequency. In step S307, when the power value of the first output signal is decreasing, the converter 10 reduces the first work frequency.

In an embodiment, the first work frequency is a time ratio between a transition period T1 and a standby period T2 in a cycle P1, that is, is a time ratio of the transition period T1 to a cycle P1. As shown in FIG. 4, the cycle P1 includes multiple time internals t1 to t7. As described in the schematic drawing of the first output signal, the cycles P1 are the time internals t1 to t5, the time internals t6 to t10, and so on. The transition period T1 is, for example, the time internal t1 during the time internals t1 to t5, the standby period T2 is, for example, the time internals t2 to t5 during the time internals t1 to t5. With respect to the first work frequency equal to the time ratio of the transition period T1 to the cycle P1, the time ratio of the transition period T1 to the cycle Pb is 1/5 in the schematic diagram of the first output signal; and the time ratio of the transition period T1 to the cycle P1 is 1/4 in the schematic diagram of the second output signal. Similarly, the time ratio of the transition period T1 to the cycle P1 is 1/2.5 in the schematic diagram of the third output signal; the time ratio of the transition period T1 to the cycle P1 is 1/2 in the fourth output signal.

In an embodiment with respect to the preset conversion rate of 50%, when the converter 10 determines the conversion rate is 10% according to the power value of the input signal, since the conversion rate of 10% is 1/5 times the preset conversion rate of 50%, the converter 10 converts the input signal into the first output signal by the time ratio of the transition period T1 to the cycle P1, which is 1/5. In other words, the converter 10 converts the input signal into the first output signal by the conversion rate of no less than 50% during the time internal t1 within the transition period T1 but does not convert the input signal into the first output signal during the time internals t2 to t5 within the standby period T2, and after that, converts the input signal into the first output signal by the conversion rate of no less than 50% again during the transition period T1, i.e. the time internal t6, within a next cycle P1.

When the converter 10, according to the power value of the input signal, determines that the conversion rate is 12.5%, since the conversion rate of 12.5% is 1/4 times the preset conversion rate of 50%, the converter 10 converts the input signal into the first output signal by the time ratio of the transition period T1 to the cycle P1, which is 1/4. In other words, the converter 10 converts the input signal into the first output signal by the conversion rate of no less than 50% during the time internal t1 within the transition period T1 but does not convert the input signal into the first output signal during the time internals t2 to t4 within the standby period T2, and after that, converts the input signal into the first output signal by the conversion rate of not less than 50% again during the transition period T1, i.e. the time internal t5, within the cycle P1.

In an embodiment, when the converter 10, according to the power value of the input signal, determines that the conversion rate is 12%, because the conversion rate of 12% is between 10% and 12.5%, the converter 10 converts the input signal into the first output signal by the time ratio of the transition period T1 to the cycle P1, which is 1/5. That is, the converter 10 can determine the range of the power value of the input signal and use the range of the power value of the input signal to determine the time ratio related to the transition period T1 and the time ratio related to the standby period T2.

In an embodiment, the above preset conversion rate of 50% is the conversion rate at the maximum power point of the converter 10. Specifically, when the power value of the input signal applied to the converter 10 is equal to a preset power value, the converter 10 is capable of converting 50% of the input signal into the output signal. When the power value of the input signal applied to the converter 10 is lower than the preset power value, the conversion rate of the converter 10 may greatly become lower than 50%. When the power value of the input signal applied to the converter 10 is higher than the preset power value, the conversion rate of the converter 10 may slightly become higher than 50%.

Therefore, in this aforementioned embodiment, when the converter 10, according to the power value of the input signal, determines that the conversion rate is 12.5%, the converter 10 will consider that the power value of the input signal arrives at a power threshold. Particularly, when the power value of the input signal applied to the converter 10 is 98 W, the converter 10 is capable of converting 50% of the input signal into the output signal; when the power value of the input signal applied to the converter 10 is 93 W, the converter 10 determines that the conversion rate is 12.5%, and then converts the input signal into the first output signal by the time ratio of the transition period T1 to the cycle P1, which is 1/4. Also, the converter 10 stores energy during the standby period T2 and converts the input signal into the first output signal by the conversion rate of 50% during the transition period T1.

In this embodiment, assume that the minimum time ratio of the transition period T1 to the cycle P1 is 1/5. Then, if the time ratio of the transition period T1 to the cycle P1 is equal to 1/5 and the conversion rate of the first output signal to the input signal during the transition period T1 is still less than 50%, it indicates that the load of the converter 10 is too small and should stop outputting the first output signal. Other embodiments may be contemplated in which the minimum time ratio is 1/6, 1/7 or other suitable fraction.

Figure 6A:
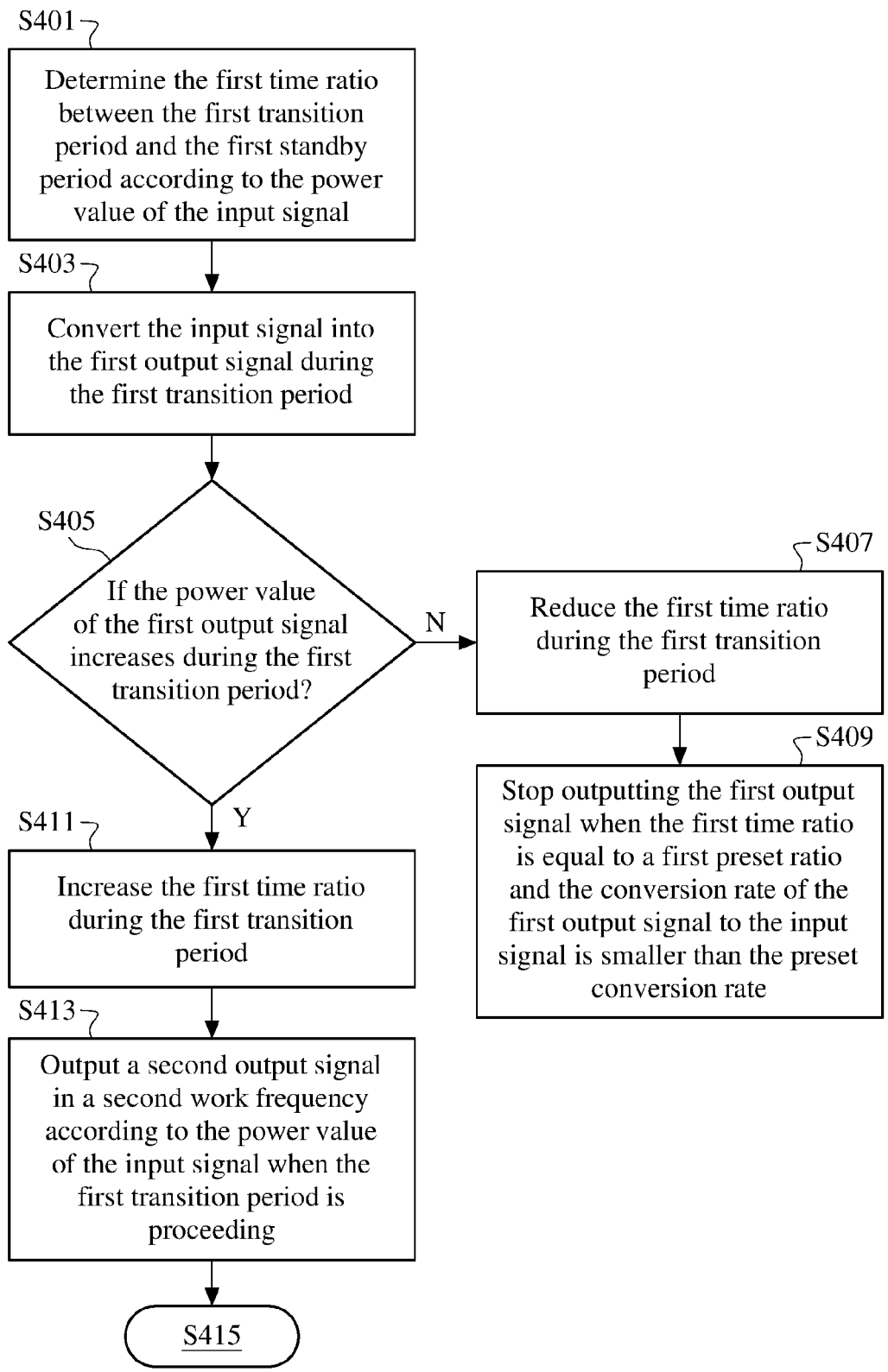
FIG. 6A and FIG. 6B illustrate a flow chart of a control method applied to the DC to AC converter in another embodiment.
Figure 6B:
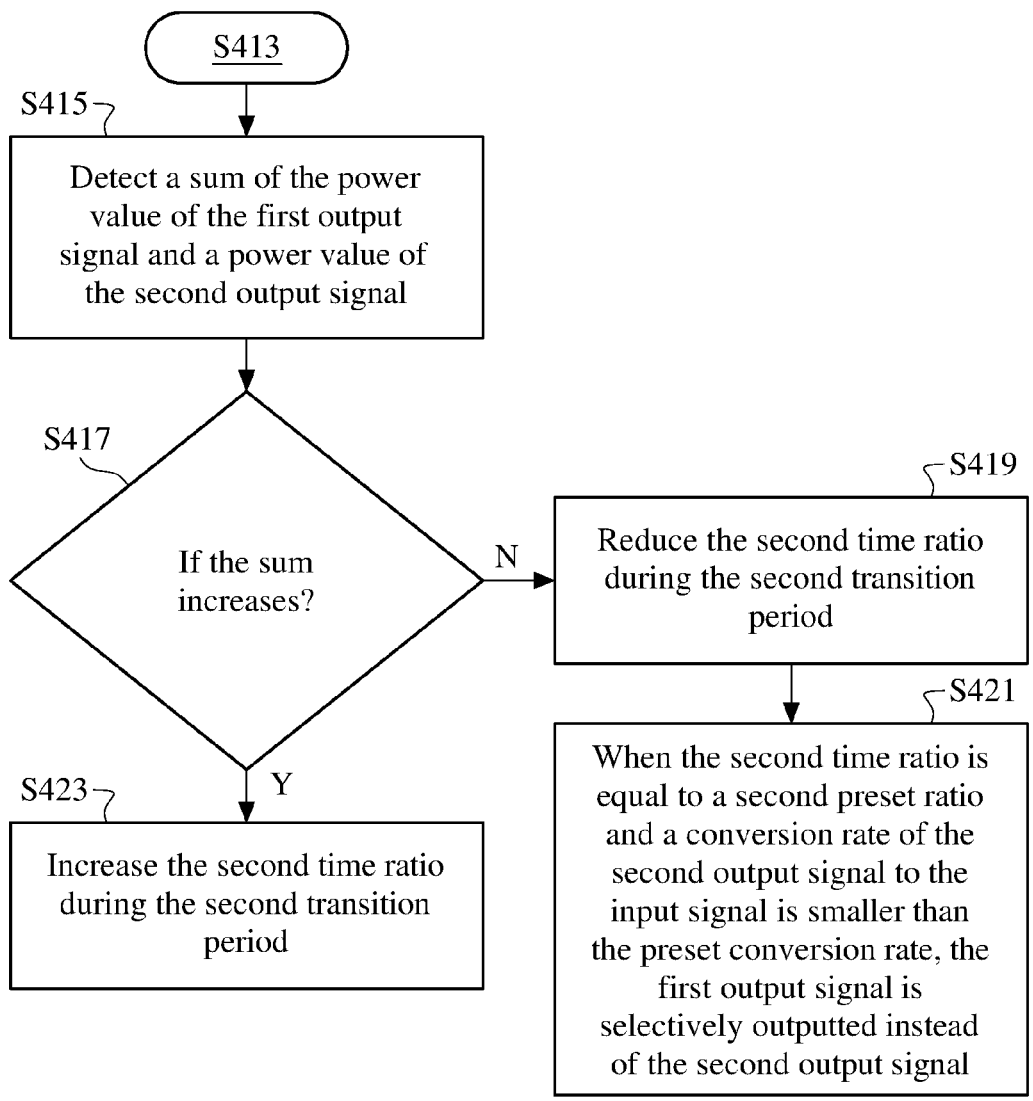
Figure 7:
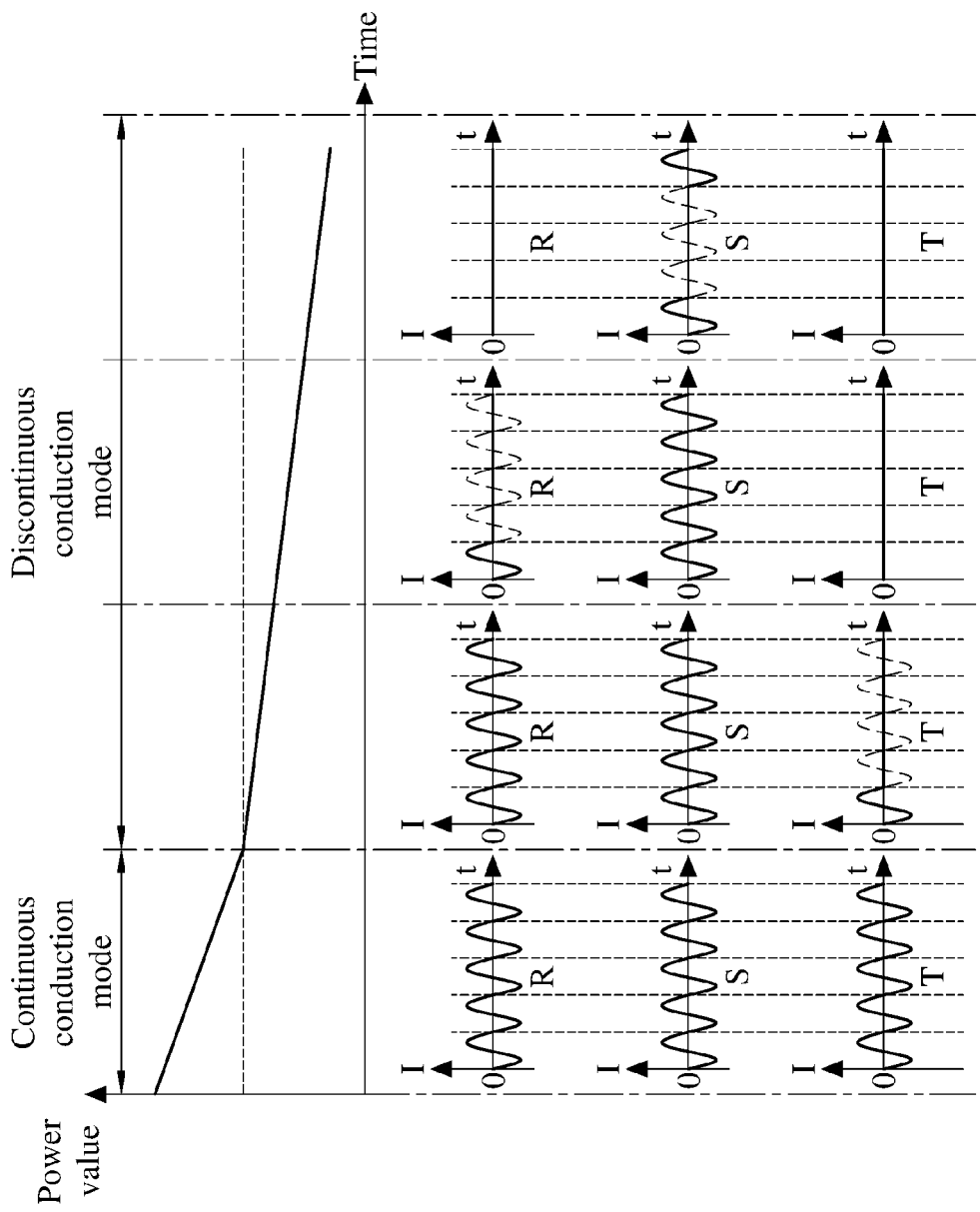
FIG. 7 is a schematic diagram of an output signal of the DC to AC converter in a discontinuous conduction mode in another embodiment.

To clarify the operation of the converter 10, please refer to FIG. 1 and FIG. 5 to FIG. 7. FIG. 5 is a schematic diagram of an output signal of the DC to AC converter in a continuous conduction mode in an embodiment, FIG. 6A and FIG. 6B illustrate a flow chart of a control method applied to the DC to AC converter in another embodiment, and FIG. 7 is a schematic diagram of an output signal of the DC to AC converter in a discontinuous conduction mode in another embodiment. If the converter 10 is a three-phase converter, the converter 10 in the continuous conduction mode outputs a R-phase AC signal, a S-phase AC signal, and a T-phase AC signal, and every two of the R-phase, S-phase and T-phase AC signals have a difference in phase therebetween, as shown in FIG. 5. The converter 10 in the discontinuous conduction mode selectively outputs one of the R-phase, S-phase and T-phase AC signals, and the outputted AC signal has a respective work frequency defined based on the power value of the input signal.

To concisely describe the disclosure, FIG. 6A and FIG. 6B illustrate a three-phase converter switches from the discontinuous conduction mode to the continuous conduction mode. As described from right to left in FIG. 7, the converter 10 operate in a sequence of S phase, R phase and T phase. In step S401, the converter 10, according to the power value of the input signal, determines the first time ratio between the first transition period and the first standby period, e.g. the time ratio of the first transition period to the first cycle in the S phase is 1/4 as shown in FIG. 7. In step S403, the converter 10 in S-phase converts the input signal into the first output signal during the first transition period. In step S405, the converter 10 detects whether the power value of the first output signal increases during the first transition period. When the power value of the first output signal decreases, the converter 10 reduces the first time ratio during the first transition period in step S407. In step S409, when the first time ratio arrives at a first preset ratio and the conversion rate of the first output signal to the input signal is less than a preset conversion rate during the first transition period, the output of the first output signal is suspended.

In an example, assume that the preset power value is 50%, the first preset ratio is 1/5, and the time ratio of the first transition period to the first cycle in S phase is 1/4. When the first output signal is being outputted during the first transition period and the power value of the first output signal decreases, the first output signal in S phase is outputted by the time ratio of the first transition period to the first cycle, which is 1/5, during the first transition period. During the outputting of the first output signal in S phase by the time ratio of the first transition period to the first cycle, which is 1/5, if the power value of the first output signal is still decreasing and the conversion rate in S phase is less than the preset conversion rate of 50% during the first transition period, the outputting of the first output signal in S phase is suspended.

Subsequently, when the power value of the first output signal in S phase increases, the first time ratio is increased during the first transition period in step S411. In step S413, when the first transition period is proceeding, the second output signal having the second work frequency is outputted according to the power value of the input signal. As described in the second stage in FIG. 7, when the first output power value in S phase increases, the first work frequency in S phase is being modulated until the first output signal is continuously outputted in S phase. In other words, when there is no standby period within the first cycle in S phase, the second output signal having the second work frequency is discontinuously outputted in R phase.

In step S415, detect a sum of the power value of the first output signal in S phase and the power value of the second output signal in R phase. In step S417, determine whether the sum of the power value of the first output signal in S phase and the power value of the second output signal in R phase increases. When the sum of the power values of the first and second output signals decreases, the second time ratio in R phase is decreased during the second transition period in step S419. In step S421, when the second time ratio arrives at a second preset ratio and the conversion rate of the second output signal to the input signal is less than the preset conversion rate, the outputting of the second output signal in R phase is suspended and the first output signal in S phase is selectively outputted. In other words, when the second time ratio is 1/5, the conversion rate related to the second output signal in R phase is less than the preset conversion rate of 50% during the second transition period, the outputting of the second output signal in R phase is suspended and only the first output signal in S phase is outputted during the first transition period, as described in the first stage.

As described above, when the sum of the power values of the first and second output signals increases, the second time ratio is increased during the second transition period in step S423. For example, when the power value of the input signal applied to the converter 10 increases and the input signal, leading to the continuously outputting of the first output signal in S phase, is sufficiently used to increase the second work frequency of the second output signal in R phase, the second work frequency in R phase is being increased, that is, the ratio of the second transition period to the second cycle in R phase is being increased, until the second output signal in R phase is continuously outputted.

Then, as described in the third stage in FIG. 7, when the first output signal in S phase and the second output signal in R phase are continuously outputted, the third output signal having the third work frequency is discontinuously outputted in T phase. Likewise, detect a sum of the power values of the first, second and third output signals. When the sum of the power values of the first, second and third output signals decreases, the third time ratio in T phase is reduced during the third transition period.

When the sum of the power values of the first, second and third output signals increases, the third time ratio in T phase is increased during the third transition period. When the third output signal is continuously outputted in T phase, the converter 10 switches to the continuous conduction mode to output the output signal as shown in FIG. 6. In an embodiment, when the converter 10 switches to the continuous conduction mode and the power value of the input signal is still increasing, the amplitudes of the S-phase, R-phase and T-phase output signals are also increasing.

In the aforementioned embodiment, when the converter 10 switches from the continuous conduction mode to the discontinuous conduction mode, the converter 10 switches to the discontinuous conduction mode by a sequence of its S phase, R phase and T phase, as described from the left part to the right part in FIG. 7. Although this embodiment is illustrated based on the sequence of its S phase, R phase and T phase, other embodiments may contemplated in which the converter 10 switches from the continuous conduction mode to the discontinuous conduction mode in another order or switches from the discontinuous conduction mode to the continuous conduction mode in another order. In this or some embodiments, a sequence of S phase, R phase and T phase is set randomly in order to avoid damaging any phase of the three phases, which is frequently used.

As set forth above, the disclosure provides a control method applied to a DC to AC converter, which first modulates a time ratio between a transition period and a standby period to suspend the outputting of an output signal of the DC to AC converter under light load during a standby period in order to store solar energy. Then, the disclosure converts the stored energy into AC electricity during a transition period in order to output the AC electricity in a better power conversion point. Therefore, when the load of the converter becomes lighter, the converter is capable of reducing the switching rates of its switching components in order to reduce the power consumption caused by the switching of the switching components. Also, the converter is capable of reducing the percentage of input power occupied by the power consumption of the converter, and increasing the conversion rate of the converter under light load.

What is claimed is:
1. A control method applied to a DC to AC converter capable of selectively operating in a continuous conduction mode or in a discontinuous conduction mode, in which the control method comprises:

outputting a first output signal in a first work frequency according to a power value of an input signal, wherein the first work frequency is associated with a plurality of first cycles, and a first transition period and a first standby period in each of the plurality of first cycles have a first time ratio therebetween;

detecting a power value of the first output signal during the first transition period;

increasing the first work frequency when the power value of the first output signal is increasing; and reducing the first work frequency when the power value of the first output signal is decreasing.

2. The control method according to claim 1, wherein each of the plurality of first cycles comprises a plurality of time internals, and the first time ratio between the first transition period and the first standby period is a percentage of the time internals that is occupied.

3. The control method according to claim 1, further comprising:

determining a range of the power value of the input signal; and determining the first time ratio between the first transition period and the first standby period according to the range of the power value of the input signal.

4. The control method according to claim 1, further comprising:

converting the input signal into the first output signal during the first transition period, wherein a conversion rate of the first output signal to the input signal is not smaller than a preset conversion rate.

5. The control method according to claim 4, wherein outputting the first output signal in the first work frequency according to the power value of the input signal comprises determining the first time ratio between the first transition period and the first standby period according to a ratio between the power value of the input signal and a preset power value.

6. The control method according to claim 5, wherein when the first time ratio between the first transition period and the first standby period is equal to a first preset ratio during the first transition period and the conversion rate of the first output signal to the input signal is smaller than the preset conversion rate, the DC to AC converter stops outputting the first output signal.

7. The control method according to claim 5, wherein when the first output signal is being outputted in the first work frequency and the first transition period is proceeding, the control method further comprises:

outputting a second output signal in a second work frequency according to the power value of the input signal, wherein the second output signal and the first output signal have a difference in phase therebetween, the second work frequency is associated with a plurality of second cycles, and a second transition period and a second standby period in each of the plurality of second cycles have a second time ratio therebetween.

8. The control method according to claim 7, further comprising:

detecting a sum of the power value of the first output signal and a power value of the second output signal;

increasing the second work frequency when the sum of the power values of the first output signal and the second output signal is increasing; and decreasing the second work frequency when the sum of the power values of the first output signal and the second output signal is decreasing.

9. The control method according to claim 7, wherein outputting the second output signal in the second work frequency according to the power value of the input signal comprises determining the second time ratio between the second transition period and the second standby period according to the power value of the input signal, the power value of the first output signal and the preset power value.

10. The control method according to claim 9, wherein when the second time ratio between the second transition period and the second standby period is equal to a second preset ratio and a conversion rate of the second output signal to the input signal is smaller than the preset conversion rate during the second transition period, the first output signal is selectively outputted instead of the second output signal.

* * * * *